United States Patent
Bastesen (10) Patent No.: US 9,206,652 B2
(45) Date of Patent: Dec. 8, 2015

(54) CONNECTION SYSTEM FOR SUBSEA CONNECTION OF A SUBSEA UMBILICAL TO A SUBSEA APPLIANCE

(71) Applicant: VETCO GRAY SCANDINAVIA AS

(72) Inventor: Rolf Bastesen, Sandvika (NO)

(73) Assignee: Vecto Gary Scandinavia AS, Sandvika (NO)

( * ) Notice: Subject to any disclaimer, the term of this patent is extended or adjusted under 35 U.S.C. 154(b) by 0 days.

(21) Appl. No.: 14/574,881

(22) Filed: Dec. 18, 2014

(65) Prior Publication Data

US 2015/0176340 A1 Jun. 25, 2015

(30) Foreign Application Priority Data

Dec. 19, 2013 (NO) .................................. 20131709

(51) Int. Cl.
| | |
|---|---|
| *E21B 43/013* | (2006.01) |
| *F16L 1/26* | (2006.01) |
| *E21B 17/046* | (2006.01) |
| *F16L 37/56* | (2006.01) |

(52) U.S. Cl.
CPC ............ *E21B 17/046* (2013.01); *E21B 43/013* (2013.01); *F16L 1/26* (2013.01); *F16L 37/56* (2013.01)

(58) Field of Classification Search
CPC ....... E21B 43/013; E21B 43/0107; F16L 1/26
USPC .......... 166/345, 341, 343, 360, 368; 405/158, 405/169
See application file for complete search history.

(56) References Cited

U.S. PATENT DOCUMENTS

| | | | | |
|---|---|---|---|---|
| 4,086,778 | A | * | 5/1978 | Latham et al. ................. 405/191 |
| 4,191,256 | A | * | 3/1980 | Croy et al. ..................... 166/343 |
| 6,805,382 | B2 | * | 10/2004 | Jennings .......................... 285/18 |
| 7,402,000 | B2 | * | 7/2008 | Bastesen et al. ............... 405/170 |

(Continued)

FOREIGN PATENT DOCUMENTS

| | | |
|---|---|---|
| DE | 202008008692 U1 | 9/2008 |
| DE | 202010014532 U1 | 12/2010 |

OTHER PUBLICATIONS

Unofficial English translation of Office Action issued in connection with corresponding NO Application No. 20131709 on Jul. 4, 2014.

(Continued)

*Primary Examiner* — Matthew Buck
(74) *Attorney, Agent, or Firm* — GE Global Patent Operation (57) ABSTRACT

A connection system for subsea connection of a subsea umbilical to a subsea appliance, the system comprising a termination box fixed to the umbilical; a first coupling part mounted to the termination box; a second coupling part; a connection unit, to which the termination box is slidably mounted; and a landing unit, which has a fixed position in relation to the second coupling part. Guide members are provided on the connection unit and the landing unit for guiding the connection unit into a correct position in relation to the landing unit when the connection unit is lowered downwards into contact with the landing unit. The termination box is displaceable axially forwards in relation to the connection unit by means of an actuating unit so as to bring the first coupling part into contact with the second coupling part.

20 Claims, 6 Drawing Sheets

(56) References Cited

U.S. PATENT DOCUMENTS

| | | | |
|---|---|---|---|
| 8,057,126 B2* | 11/2011 | Mogedal et al. | 405/170 |
| 8,141,909 B2* | 3/2012 | Clover et al. | 285/124.3 |
| 8,961,070 B1* | 2/2015 | Mascarenhas | 405/170 |
| 2007/0269270 A1* | 11/2007 | Bastesen et al. | 405/170 |
| 2008/0014026 A1 | 1/2008 | Routeau et al. | |
| 2011/0005764 A1* | 1/2011 | Bekkevold | 166/344 |
| 2012/0090152 A1* | 4/2012 | White | 29/464 |
| 2012/0199358 A1* | 8/2012 | Larsson | 166/341 |
| 2012/0201607 A1* | 8/2012 | Larsson et al. | 405/169 |
| 2013/0309886 A1 | 11/2013 | Tiberghien et al. | |

OTHER PUBLICATIONS

European Search Report and Opinion issued in connection with corresponding EP Application No. 14004319.1 on Mar. 18, 2015.

* cited by examiner

CONNECTION SYSTEM FOR SUBSEA CONNECTION OF A SUBSEA UMBILICAL TO A SUBSEA APPLIANCE

BACKGROUND

Embodiments of the present invention relate to a connection system for subsea connection of a first subsea umbilical to a subsea appliance in the form of a second subsea umbilical or an umbilical termination assembly.

Development within offshore oil and gas exploration in the recent years has been directed to subsea installations for processing and transport of oil and gas. These subsea installations replace the traditional platforms, where oil and gas were transported up to the platform for further processing and transport. This development of subsea production, processing and transport systems has resulted in an increasing need for connection systems for connecting a subsea umbilical to another subsea umbilical or an umbilical termination assembly at or near the seabed. An umbilical may be used for conveying fluids and/or transmitting communication signals between a surface structure and subsea well equipment.

A connection system is previously known from U.S. Pat. No. 8,141,909B2.

SUMMARY OF THE INVENTION

The object of an embodiment the present invention is to achieve a further development of a connection system of the above-mentioned type so as to provide a connection system that is improved in at least some aspect.

The connection system of the present invention is to be used for subsea connection of a first subsea umbilical to a subsea appliance in the form of a second subsea umbilical or an umbilical termination assembly, the connection system comprising: a termination box fixed to an end section of the first subsea umbilical, the termination box having a front end and an opposite rear end, wherein the first subsea umbilical extends through an opening at the rear end of the termination box; a first umbilical coupling part mounted to the termination box at the front end thereof, this coupling part comprising several first coupling members, each of which being connected to a respective fluid conduit of the first subsea umbilical; a second umbilical coupling part which is connectable to the first umbilical coupling part and comprises several second coupling members, each of which being connected to a respective fluid conduit of said subsea appliance and being configured to engage with one of said first coupling members when the first and second umbilical coupling parts are connected to each other; a connection unit, the termination box being slidably mounted to the connection unit so as to be axially displaceable in relation to the connection unit; and a landing unit, which has a fixed position in relation to the second umbilical coupling part.

The connection unit is connectable to the landing unit by being lowered downwards into contact with the landing unit and is provided with guide members configured to co-operate with corresponding guide members on the landing unit so as to guide the connection unit into a correct position in relation to the landing unit when the connection unit is lowered downwards into contact with the landing unit. The connection system also comprises an actuating unit for displacing the termination box and the end section of the first subsea umbilical axially forwards in relation to the connection unit so as to bring the first umbilical coupling part into contact with the second umbilical coupling part.

With the connection system of the present invention, the first umbilical coupling part is arranged in a predetermined position in relation to the second umbilical coupling part when the connection unit has been properly connected to the landing unit, whereupon the first umbilical coupling part may be moved into mating contact with the second umbilical coupling part in a simple and reliable manner by being displaced axially forwards in relation to the connection unit. The connection unit and the landing unit will together secure that the first umbilical coupling part is properly aligned with the second umbilical coupling part during the displacement of the first umbilical coupling part into contact with the second umbilical coupling part. Hereby, the subsea operation of connecting the umbilical coupling parts to each other is simplified.

According to an embodiment of the invention, the connection unit comprises a base frame provided with a U-shaped slide channel, the termination box being slidably received in this slide channel. The U-shaped slide channel defines the direction of movement of the termination box during the displacement of the termination box in relation to the connection unit.

According to another embodiment of the invention, the base frame is provided with at least two connection pins which extend into said slide channel at opposite sides of the slide channel, each connection pin being received in a longitudinal connection groove provided in the termination box to thereby secure the termination box to the slide channel while allowing the termination box to slide in the longitudinal direction of the slide channel. Hereby, the termination box is secured to the slide channel in a simple and reliable manner.

According to another embodiment of the invention, the connection unit comprises an installation yoke, which is pivotally mounted to the base frame and in which the base frame is intended to be suspended when the connection unit is lowered downwards into contact with the landing unit. Hereby, the termination box and the base frame of the connection unit may be vertically inclined in a suitable manner during the lowering of the connection unit into contact with the landing unit to thereby facilitate a proper landing of the connection unit onto the landing unit.

According to another embodiment of the invention, the installation yoke comprises a first arm, which is pivotally connected to the base frame through a first joint, and a second arm, which is pivotally connected to the base frame through a second joint, the installation yoke and the base frame being pivotable in relation to each other about a pivot axis formed by said first and second joints.

According to another embodiment of the invention, said guide members on the connection unit comprise two guide pins, which extend from the base frame in opposite directions and which are concentric with said pivot axis, each one of these guide pins being configured to come into engagement with a corresponding guide member in the form of a guide groove provided in the landing unit when the connection unit is lowered downwards into contact with the landing unit. Owing to the fact that the guide pins are concentric with said pivot axis, the base frame may be pivoted about the pivot axis without affecting the position of the guide pins in relation to the landing unit, which in its turn will facilitate a proper landing of the connection unit onto the landing unit.

According to another embodiment of the invention, the installation yoke is provided with at least one locking member which is configured to come into engagement with a corresponding locking member on the landing unit when the guide members on the connection unit are in engagement with the corresponding guide members on the landing unit and the installation yoke is pivoted in relation to the base frame from a raised position to a lowered position, wherein these locking members, when they are in engagement with each other, prevent the connection unit from being disconnected from the landing unit. Hereby, the connection unit is automatically secured to the landing unit when the installation yoke is pivoted from the raised position to the lowered position.

According to another embodiment of the invention, the first umbilical coupling part and the second umbilical coupling part are provided with corresponding alignment members, which are configured to come into contact with each other in order to align the coupling members of the first umbilical coupling part with the coupling members of the second umbilical coupling part when the termination box and the end section of the first subsea umbilical are displaced axially forwards in relation to the connection unit. The alignment members will secure that the coupling members of the first umbilical coupling part will be properly aligned with the coupling members of the second umbilical coupling part when the coupling members are brought into engagement with each other.

According to another embodiment of the invention, the connection unit is provided with at least one locking member which is moveable between a locking position, in which the locking member prevents the termination box from being axially displaced in relation to the connection unit, and an unlocking position, in which the locking member allows the termination box to be axially displaced in relation to the connection unit. By means of this locking member, the termination box may be secured to the connection unit in a fixed position and prevented from sliding in relation to the connection unit during the lowering of the connection unit into contact with the landing unit.

Further advantages as well as advantageous features of the connection system of the present invention will appear from the following description.

BRIEF DESCRIPTION OF THE DRAWINGS

With reference to the appended drawings, a specific description of embodiments of the invention cited as examples follows below. In the drawings.

DETAILED DESCRIPTION

Figure 1:
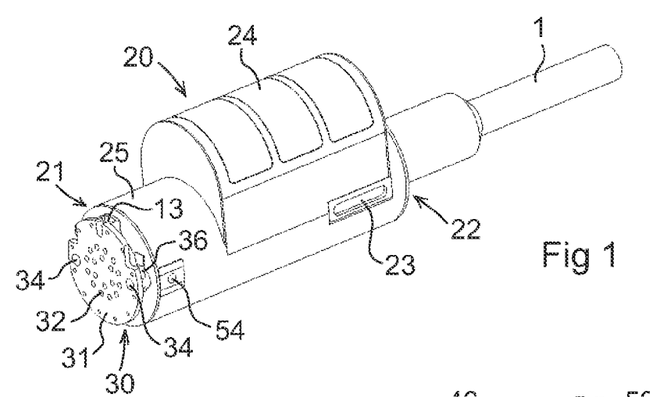
FIG. 1 is a perspective view of a termination box mounted to the end section of a subsea umbilical.
Figure 2:
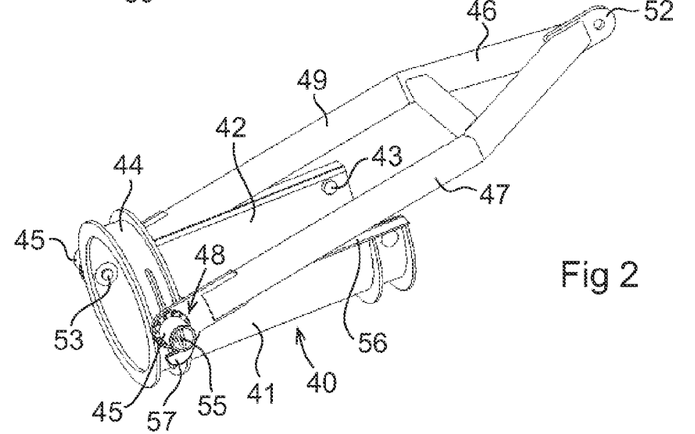
FIG. 2 is a perspective view of a connection unit included in a connection system according to an embodiment of the present invention.
Figure 3:
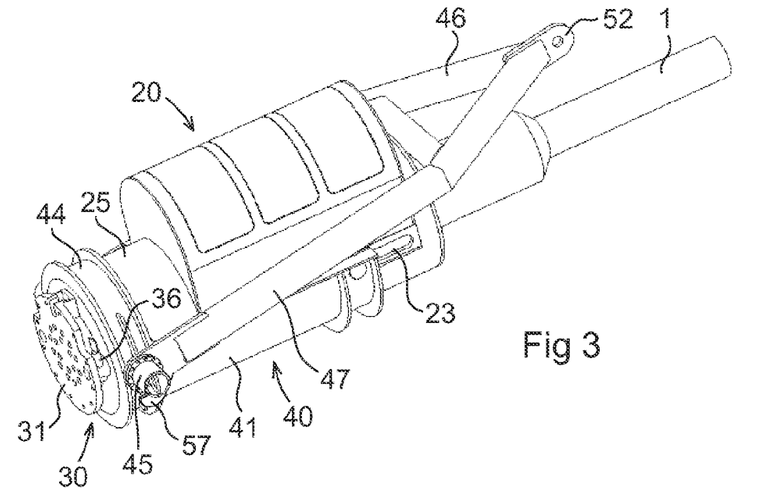
FIG. 3 is a perspective view of the termination box of FIG. 1 mounted to the connection unit of FIG. 2.
Figure 4:
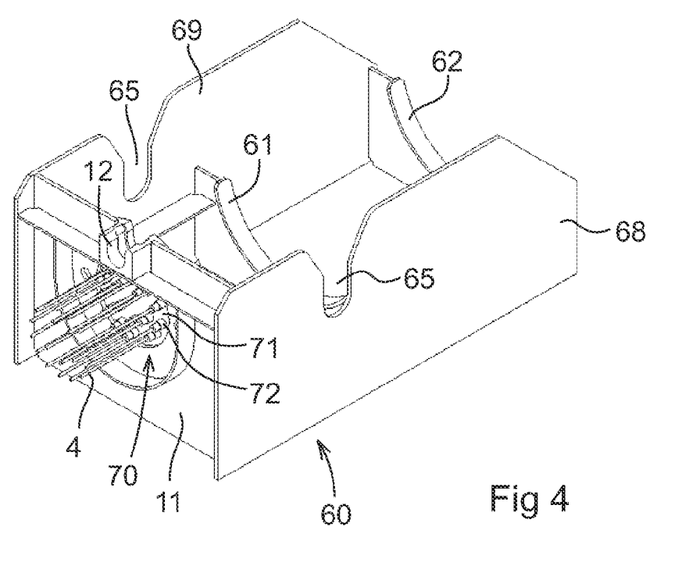
FIG. 4 is a perspective view of a landing unit included in a connection system according to an embodiment of the invention.
Figure 5A:
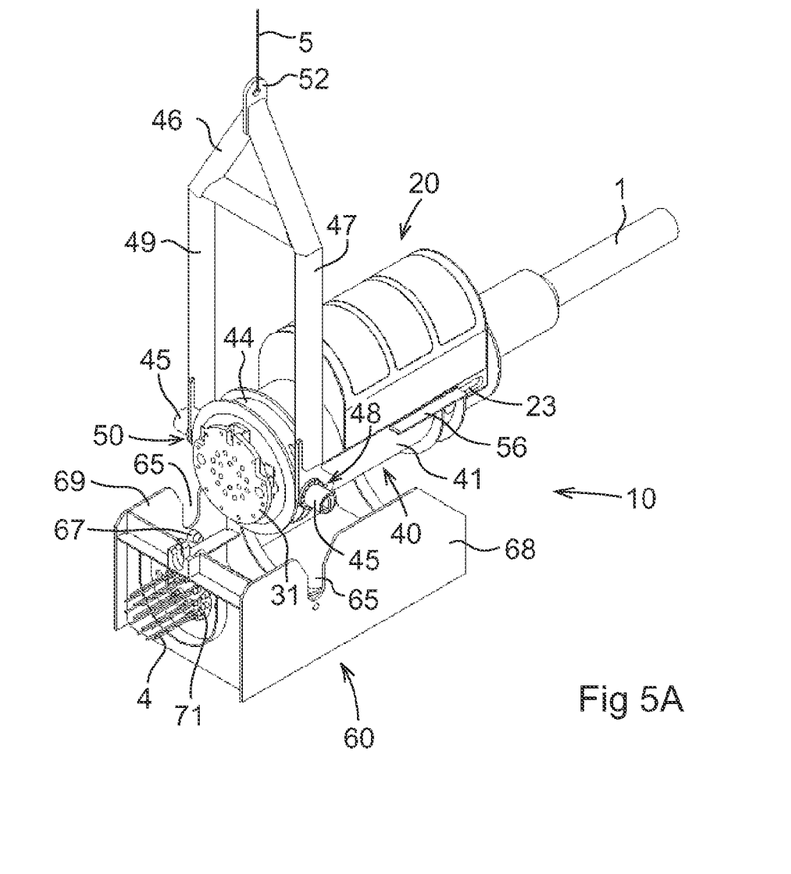
FIGS. 5A, 5B, 5C, 5D, 5E, 5F, and 5G illustrate different steps in a process of connecting the end section of a subsea umbilical to a subsea appliance by means of the connection unit and landing unit of FIGS. 2-4.
Figure 5B:
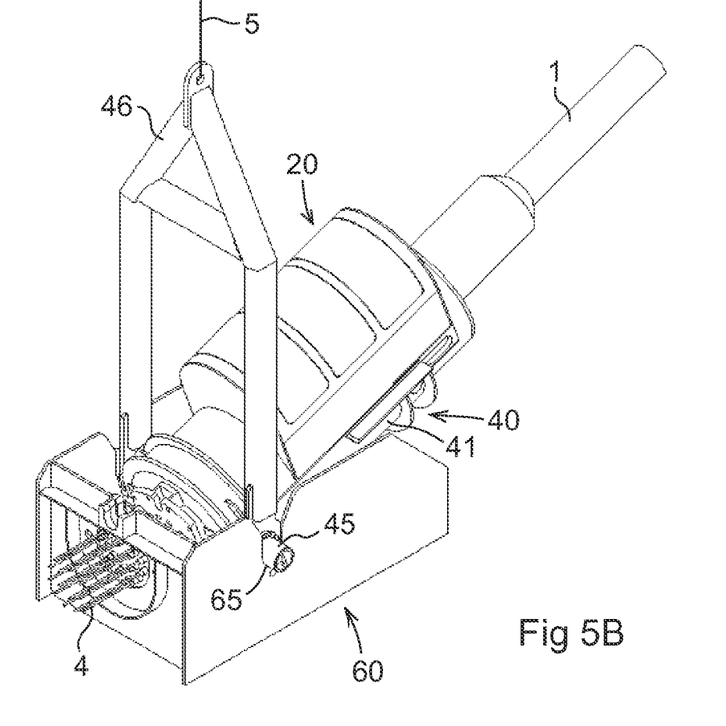
Figure 5C:
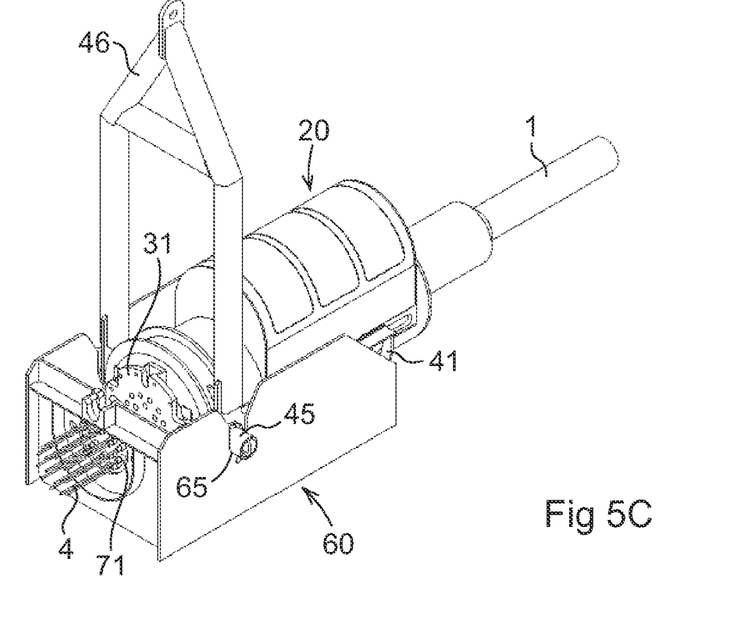
Figure 5D:
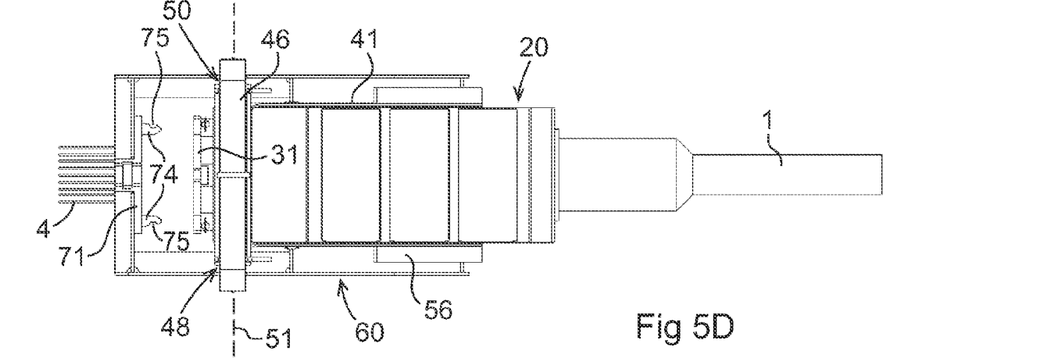
Figure 5E:
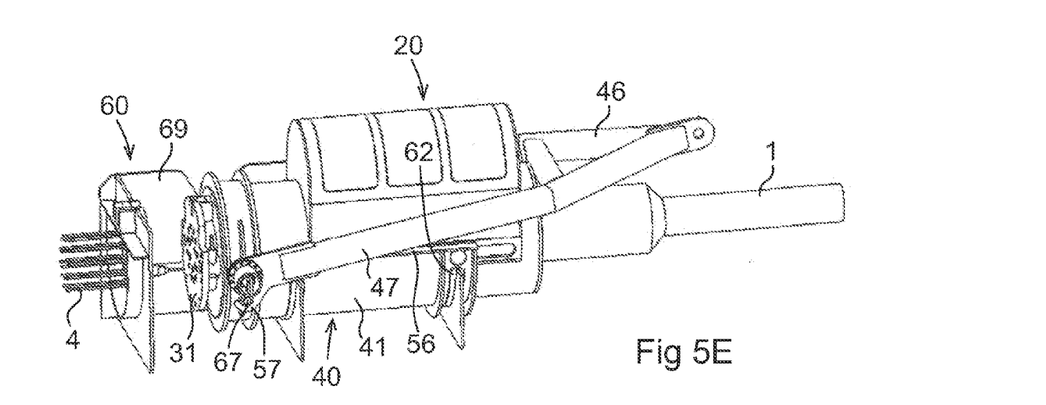
Figure 5F:
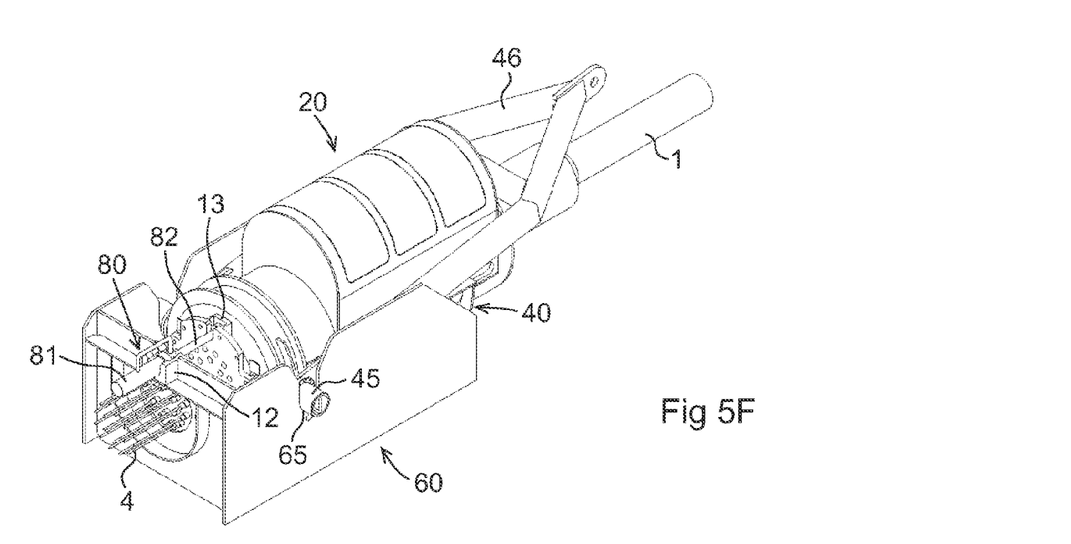
Figure 5G:
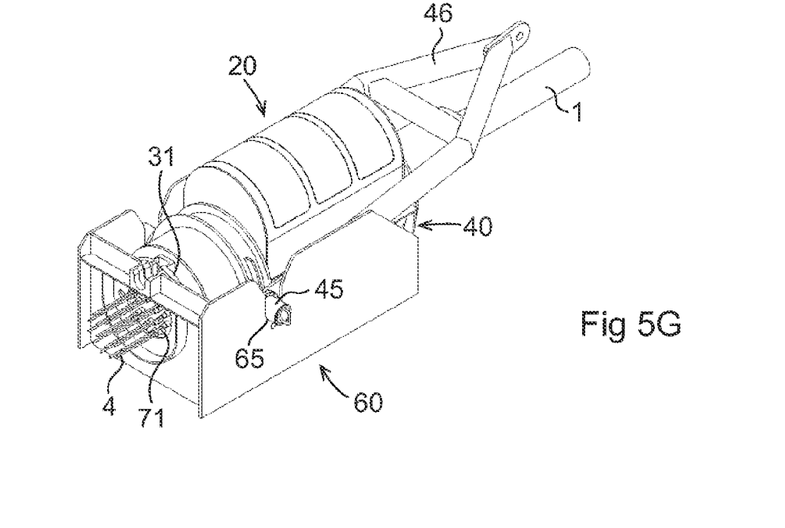
Figure 6:
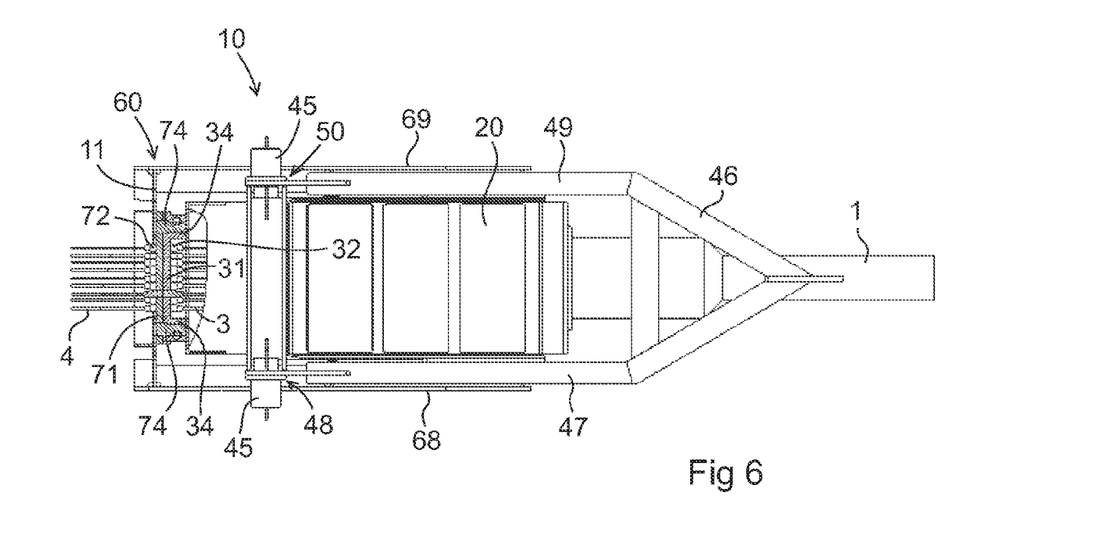
FIG. 6 is a partly cut planar view from above of a subsea umbilical connected to a subsea appliance by means of the connection unit and landing unit of FIGS. 2-4.
Figure 7:
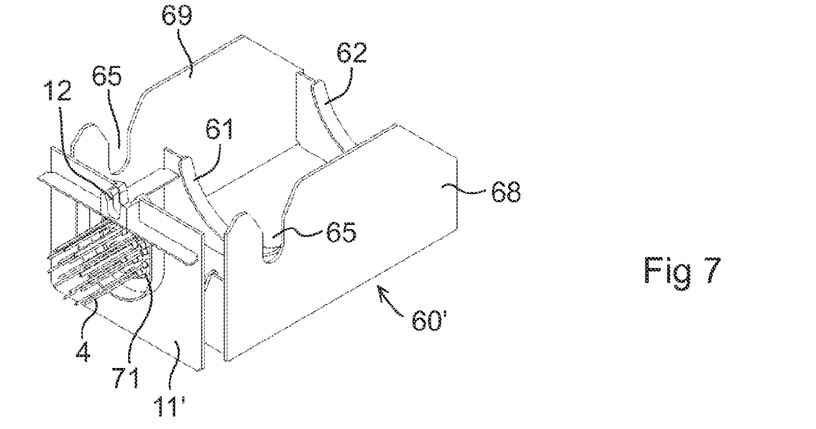
FIG. 7 is a perspective view of a landing unit of an alterative type.
Figure 8:
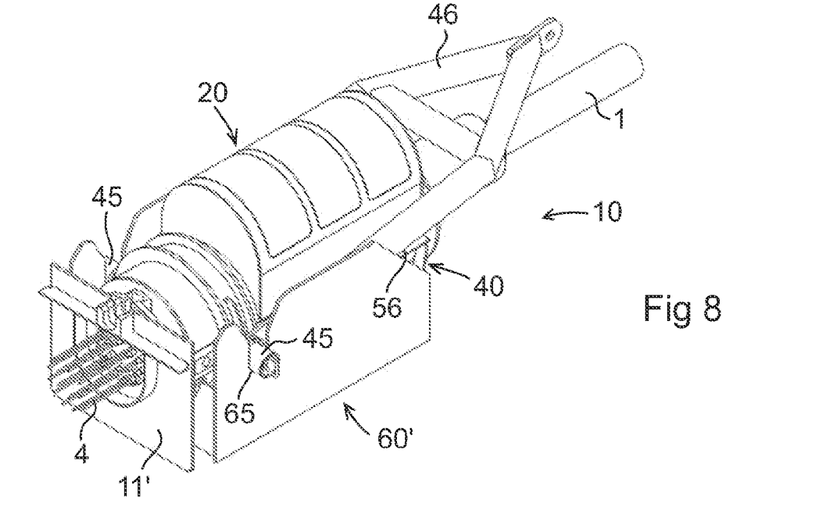
FIG. 8 is a perspective view of an end section of a subsea umbilical connected to a subsea appliance by means of a connection unit and termination box of the types illustrated in FIGS. 1-3 and a landing unit of the type illustrated in FIG. 7.
Figure 9:
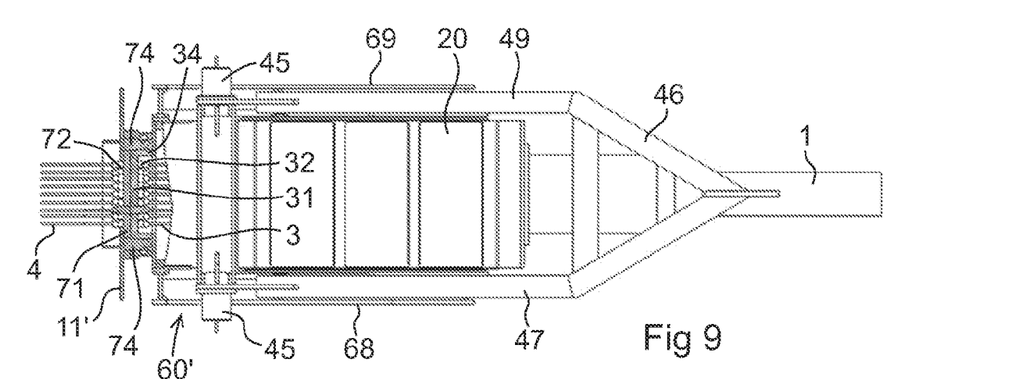
FIG. 9 is a partly cut planar view from above of a subsea umbilical connected to a subsea appliance by means of a connection unit and termination box of the types illustrated in FIGS. 1-3 and a landing unit of the type illustrated in FIG. 7.

A connection system 10 according to two different embodiments of the present invention is illustrated in FIGS. 1-9. The connection system 10 is to be used for connecting a first subsea umbilical 1 to a subsea appliance (not shown) at or near the seabed, wherein the first subsea umbilical 1 and said subsea appliance comprise several fluid conduits 3, 4, as illustrated in FIGS. 6 and 9. By means of the connection system 10, each fluid conduit 3 of the first subsea umbilical 1 is connected to a corresponding fluid conduit 4 of the subsea appliance. Said subsea appliance may be a second subsea umbilical or an umbilical termination assembly.

The connection system 10 comprises a termination box 20, which is fixed to an end section of the first subsea umbilical 1. The end section of the first subsea umbilical 1 is intended to be fixed to the termination box 20 during and after the connection of the first subsea umbilical 1 to the subsea appliance. The termination box 20 has a front end 21 and an opposite rear end 22, wherein the first subsea umbilical 1 extends through an opening at the rear end 22 of the termination box. The termination box 20 is provided with an access hatch 24, which is openable in order to allow access to the interior of the termination box from the outside.

A first umbilical coupling part 30 is mounted to the termination box 20 at the front end 21 thereof. This umbilical coupling part 30 comprises a coupling plate 31 and several first coupling members 32 (see FIGS. 1, 6 and 9) mounted to the coupling plate. Each first coupling member 32 is connected to an end of one of said fluid conduits 3 of the first subsea umbilical 1.

The connection system 10 comprises a connection unit 40. The termination box 20 is slidably mounted to the connection unit 40 so as to be axially displaceable in relation to the connection unit 40, but prevented from rotating in relation to the connection unit 40. The connection unit 40 comprises a base frame 41 provided with a U-shaped slide channel 42, the termination box 20 being slidably received in this slide channel 42. The base frame 41 is provided with at least two connection pins 43 which extend into the slide channel 42 at opposite sides of the slide channel, each connection pin 43 being received in a longitudinal connection groove 23 provided in the termination box 20 to thereby secure the termination box to the slide channel 42 while allowing the termination box to slide in the longitudinal direction of the slide channel. A first connection groove 23 is arranged on a first side of the termination box 20 and configured to receive a first connection pin (not shown), whereas a second connection groove (not shown) is arranged opposite the first connection groove 23 on the opposite side of the termination box 20 and configured to receive a second connection pin 43. In the illustrated example, the termination box 20 has a cylindrical front part 25 which is slidably received in a ring-shaped collar 44 on the base frame 41 provided at a front end of the slide channel 42. Thus, the front end of the termination box 20 is slidably secured to the base frame 41 by means of said collar 44. The termination box 20 may of course be slidably mounted to the base frame 41 of the connection unit 40 in any other suitable manner. As an alternative to a ring-shaped collar, the front part of the termination box 20 may be secured to the slide channel 42 in the same manner as the rear part of the termination box, i.e. by means of two connection pins which extend into the slide channel 42 at opposite sides of the slide channel, each connection pin being received in a longitudinal connection groove provided in the front part of the termination box 20 to thereby secure the front part of the termination box to the slide channel 42 while allowing the termination box to slide in the longitudinal direction of the slide channel.

The first umbilical coupling part 30 is connectable to a second umbilical coupling part 70, which comprises a coupling plate 71 and several second coupling members 72 (see FIGS. 4, 6 and 9) mounted to the coupling plate. Each second coupling member 72 is connected to an end of one of said fluid conduits 4 of the subsea appliance and is configured to engage with one of said first coupling members 32 when the first and second umbilical coupling parts 30, 70 are connected to each other. When a first coupling member 32 is in engagement with a corresponding second coupling member 72, the fluid conduit 3 connected to the first coupling member 32 is in fluid communication with the fluid conduit 4 connected to the second coupling member 72. In the illustrated example, the first coupling members 32 are female-like coupling members and the second coupling members 72 are corresponding male-like coupling members, each male-like coupling member 72 being designed to fit into a corresponding female-like coupling member 32. As an alternative, the first coupling members 32 could be male-like coupling members and the second coupling members 72 corresponding female-like coupling members. As a further alternative, the first coupling members 32 as well as the second coupling members 72 could consist of a mixture of male-like and female-like coupling members.

The connection system 10 also comprises a landing unit 60, 60', which has a fixed position in relation to the second umbilical coupling part 70. In the embodiment illustrated in FIGS. 4-6, the second umbilical coupling part 70 is mounted to a holding structure 11 which is integrated in the landing unit 60. In the embodiment illustrated in FIGS. 7-9, the second umbilical coupling part 70 is mounted to a holding structure 11' which is separate from the landing unit 60' and which has a fixed position in relation to the landing unit 60'.

The connection unit 40 is connectable to the landing unit 60, 60' by being lowered downwards onto the landing unit so as to come to bear against it. Thus, the landing unit 60, 60' constitutes a landing platform for the connection unit 40. In the illustrated embodiment, the landing unit 60, 60' is provided with two seats 61, 62 which are configured to receive the base frame 41 of the connection unit 40. These seats 61, 62 have upwardly directed openings and they are mutually aligned, i.e. arranged in such a way that the centre axes of the seats are coinciding, so as to allow the base frame 41 of the connection unit 40 to extend rectilinearly through the seats 61, 62. The connection unit 40 is provided with guide members 45 configured to co-operate with corresponding guide members 65 on the landing unit 60, 60' so as to guide the connection unit 40 into a correct position in relation to the landing unit 60, 60' when the connection unit 40 is lowered downwards into contact with the landing unit. In the illustrated embodiment, said guide members on the connection unit 40 comprise two hollow guide pins 45, which extend from the base frame 41 in opposite directions, each one of these guide pins 45 being configured to come into engagement with a corresponding guide member in the form of an upwardly open guide groove 65 provided in the landing unit 60, 60' when the connection unit 40 is lowered downwards into contact with the landing unit. In the illustrated example, a first guide groove 65 is arranged in a first lateral wall 68 of the landing unit and a second guide groove 65 is arranged in an opposite second lateral wall 69 of the landing unit.

The connection unit 40 comprises an installation yoke 46, which is pivotally mounted to the base frame 41 and in which the base frame is intended to be suspended when the connection unit 40 is lowered downwards into contact with the landing unit 60, 60'. In the illustrated embodiment, the installation yoke 46 comprises a first arm 47, which is pivotally connected to the base frame 41 through a first joint 48, and a second arm 49, which is pivotally connected to the base frame 41 through a second joint 50. The installation yoke 46 is pivotable in relation to the base frame 41 about a pivot axis 51 (see FIG. 5D) formed by said first and second joints 48, 50. The above-mentioned guide pins 45 are concentric with this pivot axis 51. A lifting lug 52 is provided on the installation yoke 46 at an upper end thereof. A lifting wire is attachable to the lifting lug 52 so as to allow the connection unit 40 to be lowered from a surface vessel through this lifting wire.

The connection system 10 comprises a locking device for releasably locking the connection unit 40 to the landing unit 60, 60' when the connection unit has been properly connected to the landing unit. In the illustrated example, this locking device comprises two locking members 57 (see FIGS. 2, 3 and 5E) provided on the installation yoke 46. Each one of these locking members 57 is configured to come into engagement with a corresponding locking member 67 (see FIGS. 5A and 5E) on the landing unit 60, 60' when the guide members 45 on the connection unit 40 are in engagement with the corresponding guide members 65 on the landing unit and the installation yoke 46 is pivoted in relation to the base frame 41 from a raised position to a lowered position. When the locking members 57 on the installation yoke 46 are in engagement with the locking members 67 on the landing unit 60, 60', the locking members 57, 67 prevent the connection unit 40 from being disconnected from the landing unit 60, 60'. In the illustrated example, the locking members 57 on the installation yoke 46 are hook-shaped and provided at the lower end of the respective arm 47, 49 of the installation yoke, whereas the locking members 67 on the landing unit 60, 60' are pin-shaped and provided on the respective lateral wall 68, 69 of the landing unit below the guide grooves 65. A first pin-shaped locking member 67 (see FIG. 5E) is arranged on the first lateral wall 68 of the landing unit and configured to receive a first hooked-shaped locking member 57 provided at the lower end of the first arm 47 of the installation yoke, whereas a second pin-shaped locking member 67 (see FIG. 5A) is arranged on the second lateral wall 69 of the landing unit and configured to receive a second hooked-shaped locking member (not shown) provided at the lower end of the second arm 49 of the installation yoke.

The connection system 10 comprises an actuating unit 80 (see FIG. 5F) for displacing the termination box 20 and the end section of the first subsea umbilical 1 axially forwards in relation to the connection unit 40 so as to bring the first umbilical coupling part 30 into contact with the second umbilical coupling part 70 and thereby bring the first coupling members 32 into engagement with the corresponding second coupling members 72.

In the illustrated embodiments, the actuating unit 80 is configured to act between the holding structure 11, 11' and the termination box 20, in order to pull the termination box 20 and the end section of the first subsea umbilical 1 axially forwards in relation to the base frame 41 of the connection unit 40 so as to bring the first umbilical coupling part 30 into contact with the second umbilical coupling part 70. In the illustrated example, the actuating unit 80 is a stroking device in the form of a hydraulic cylinder, which comprises a cylinder part 81, a piston displaceably received inside the cylinder part and a piston rod 82 fixed to the piston. The cylinder part 81 is, in an embodiment, detachably fixable to a holder 12 on the holding structure 11, 11' and the piston rod 82 detachably fixable to the termination box 20. In the illustrated example, the outer end of the piston rod 82 is fixed to the termination box 20 by being secured to an attachment 13 provided in the coupling plate 31 of the first umbilical coupling part 30. The holder 12 and the attachment 13 are, in an embodiment, designed to allow the actuating unit 80 to be mounted to the holder 12 and the attachment 13 by being lowered vertically downwards into engagement with the holder 12 and the attachment 13.

The first umbilical coupling part 30 and the second umbilical coupling part 70 are provided with corresponding alignment members 34, 74, which are configured to come into contact with each other in order to align the coupling members 32 of the first umbilical coupling part 30 with the corresponding coupling members 72 of the second umbilical coupling part 70 when the termination box 20 and the end section of the first subsea umbilical 1 are displaced axially forwards in relation to the connection unit 40 by means of the actuating unit 80. In the illustrated example, the second umbilical coupling part 70 is provided with two male-like alignment member 74, which are secured to the coupling plate 71 of the second umbilical coupling part and which are designed to fit into corresponding female-like alignment members 34 arranged in the coupling plate 31 of the first umbilical coupling part 30.

The connection unit 40 comprises a locking device for releasably locking the termination box 20 to the base frame 41 of the connection unit 40. In the illustrated example, this locking device comprises two locking members 53 (see FIG. 2) moveably mounted to the base frame 41 of the connection unit at opposite sides of the slide channel 42. A first locking recess 54 (see FIG. 1) is arranged on a first side of the termination box 20 and configured to receive a first locking member (not shown), whereas a second locking recess (not shown) is arranged opposite the first locking recess 54 on the opposite side of the termination box 20 and configured to receive a second locking member 53 (see FIG. 2). Each locking member 53 is moveable between an advanced locking position, in which the locking member 53 is received in the associated locking recess 54 and thereby prevents the termination box 20 from moving axially in relation to the base frame 41 of the connection unit, to a refracted unlocking position, in which the locking member 53 is out of engagement with the associated locking recess 54 and thereby allows the termination box 20 to move axially in relation to the base frame 41 of the connection unit. Each locking member 53 is connected to a handle 55, which may be manipulated by a ROV (ROV=Remotely Operated Vehicle) in order to move the locking member 53 from the locking position to the unlocking position. In the illustrated example, the locking members 53 are arranged at the above-mentioned joints 48, 50 and the handles 55 are arranged in the internal spaces of the hollow guide pins 45.

The connection system 10 also comprises a locking device for securing the first and second umbilical coupling parts 30, 70 to each other when they have been properly connected to each other. In the illustrated example, this locking device comprises two locking members 36 (see FIGS. 1 and 3), each of which being arranged behind the coupling plate 31 of the first umbilical coupling part 30 and being configured for engagement in a locking recess 75 (see FIG. 5D) provided at the outer end of one of the above-mentioned male-like alignment members 74 when the first and second umbilical coupling parts 30, 70 are connected to each other.

Different steps in a process of connecting a first subsea umbilical 1 to a subsea appliance by means of a connection system 10 of the type described above are illustrated in FIGS. 5A-5G. FIG. 5D is a planar view from above with the base frame 41 and the installation yoke 46 of the connection unit 40 and the termination box 20 shown in the positions according to FIG. 5C. FIG. 5E is a perspective view with the base frame 41 and the installation yoke 46 of the connection unit 40 and the termination box 20 shown in the positions according to FIG. 5F, but with the first side wall 68 of the landing unit 60 removed for the sake of clarity.

The first subsea umbilical 1 is mounted to a termination box 20 and the termination box is in its turn mounted to a connection unit 40 before the connection unit is lowered into the sea, whereas a landing unit 60 is mounted in a fixed position in relation to the subsea appliance at or near the seabed. The connection unit 40 is lowered into the sea, e.g. from a surface vessel, while hanging in a crane hook of a hoisting device through a first lifting wire 5 attached to the lifting lug 52 on the installation yoke 46 (see FIG. 5A). When the connection unit 40 is approaching the landing unit 60, the connection unit 40 and the termination box 20 are held in a forward pitch by means of a second lifting wire (not shown), which is attached to the first subsea umbilical 1 at a distance from the termination box 20. The locking members 53 are in the locking position during the lowering of the connection unit 40 and thereby prevent the termination box 20 from sliding in relation to the base frame 41 of the connection unit 40. The connection unit 40 is lowered further downwards until the guide members 45 on the connection unit 40 come into engagement with the corresponding guide members 65 on the landing unit 60, as illustrated in FIG. 5b. Thereafter, the base frame 41 of the connection unit 40 is pivoted about the pivot axis 51 together with the termination box 20 until the base frame 41 is received in the seats 61, 62 of the landing unit 60, as illustrated in FIG. 5C. The base frame 41 of the connection unit 40 now rests on the landing unit 60 with the coupling plate 31 of the first umbilical coupling part 30 positioned in front of and at a distance from the coupling plate 71 of the second umbilical coupling part 70. The installation yoke 46 is then pivoted backwards so as to come to rest against stop members 56 arranged on opposite sides of the base frame 41, as illustrated in FIG. 5E. When the installation yoke 46 is lowered, the locking members 57 on the arms 47, 49 of the installation yoke come into engagement with the corresponding locking members 67 on the landing unit 60 and the connection unit 40 is thereby secured to the landing unit. Thereafter, the lifting wires 5 may be released from the installation yoke 46 and the first subsea umbilical 1 and the actuating unit 80 is mounted to the above-mentioned holder 12 and attachment 13 by means of a ROV. The ROV is also made to move the locking members 53 from the locking position to the unlocking position. The actuating unit 80 is then actuated to pull the termination box 20 forwards in relation to the connection unit 40 in order to move the coupling plate 31 of the first umbilical coupling part 30 towards the coupling plate 71 of the second umbilical coupling part 70 from the position illustrated in FIG. 5F to the position illustrated in FIG. 5G. The first coupling members 32 are thereby brought into engagement with the second coupling members 72. The locking members 36 are then actuated to secure the first and second umbilical coupling parts 30, 70 to each other. Thereafter, the actuating unit 80 is released from the holder 12 and the attachment 13 by being lifted vertically upwards, and the actuating unit may then be retrieved to the surface vessel.

The invention is of course not in any way restricted to the embodiments described above. On the contrary, many possibilities to modifications thereof will be apparent to a person with ordinary skill in the art without departing from the basic idea of the invention such as defined in the appended claims.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A connection system for subsea connection of a first subsea umbilical to a subsea appliance in the form of a second subsea umbilical or an umbilical termination assembly, wherein the first subsea umbilical and the subsea appliance comprise several fluid conduits, the connection system comprising:
   a termination box fixed to an end section of the first subsea umbilical, the termination box comprising a front end and an opposite rear end, wherein the first subsea umbilical extends through an opening at the rear end of the termination box;
   a first umbilical coupling part mounted to the termination box at the front end thereof, this coupling part comprising several first coupling members, each of which being connected to one of the fluid conduits of the first subsea umbilical;
   a second umbilical coupling part which is connectable to the first umbilical coupling pan and comprises several second coupling members, each of which being connected to one of the fluid conduits of the subsea appliance and being configured to engage with one of the first coupling members when the first umbilical coupling part and the second umbilical coupling part are connected to each other;
   a connection unit, the termination box being slidably mounted to the connection unit so as to be axially displaceable in relation to the connection unit;
   a landing unit, which has a fixed position in relation to the second umbilical coupling part, wherein the connection unit is connectable to the landing unit by being lowered downwards into contact with the landing unit, the connection unit comprising guide members configured to co-operate with corresponding guide members on the landing unit so as to guide the connection unit into a correct position in relation to the landing unit when the connection unit is lowered downwards into contact with the landing unit; and
   an actuating unit configured to displace the termination box and the end section of the first subsea umbilical axially forwards in relation to the connection unit so as to bring the first umbilical coupling part into contact with the second umbilical coupling part,
   wherein the connection unit comprises a base frame comprising a U-shaped slide channel, the termination box being slidably received in this slide channel, and wherein the base frame comprise a ring-shaped collar, which is provided at a front end of the slide channel and surrounds a cylindrical front part of the termination box.

2. The connection system according to claim 1, wherein the connection unit further comprises, an installation yoke, which is pivotally mounted to the base frame and in which the base frame is intended to be suspended when the connection unit is lowered downwards into contact with the landing unit.

3. The connection system according to claim 2, wherein the installation yoke comprises a first arm, which is pivotally connected to the base frame through a first joint, and a second arm, which is pivotally connected to the base frame through a second joint, the installation yoke and the base frame being pivotable in relation to each other about a pivot axis formed by the first joint and the second joint.

4. The connection system according to claim 3, wherein the guide members on the connection unit comprise two guide pins, which extend from the base frame in opposite directions and which are concentric with the pivot axis, each one of the guide pins being configured to come into engagement with a corresponding guide member in the form of a guide groove provided in the landing unit when the connection unit is lowered downwards into contact with the landing unit.

5. The connection system according claim 2, wherein the installation yoke comprises at least one locking member which is configured to come into engagement with a corresponding locking member on the landing unit when the guide members on the connection unit are in engagement with the corresponding guide members on the landing unit and the installation yoke is pivoted in relation to the base frame from a raised position to a lowered position, wherein these locking members, when they are in engagement with each other, prevent the connection unit from being disconnected from the landing unit.

6. The connection system according to claim 1, wherein the termination box comprises an access hatch, which is openable in order to allow access to the interior of the termination box from the outside.

7. The connection system according to claim 1, wherein the actuating unit is configured to pull the termination box and the end section of the first subsea umbilical axially forwards in relation to the connection unit so as to bring the first umbilical coupling part into contact with the second umbilical coupling part.

8. The connection system according to claim 1, wherein the actuating unit is a stroking device in the form of a hydraulic cylinder.

9. The connection system according to claim 1, wherein the first umbilical coupling part and the second umbilical coupling part comprises corresponding alignment members, which are configured to come into contact with each other in order to align the coupling members of the first umbilical coupling part with the coupling members of the second umbilical coupling part when the termination box and the end section of the first subsea umbilical are displaced axially forwards in relation to the connection unit.

10. The connection system according to claim 9, wherein one of the first umbilical coupling part and the second umbilical coupling part comprises at least one male-like alignment member, which is designed to fit into a corresponding female-like alignment member arranged on the other umbilical coupling part.

11. The connection system according to claim 1. wherein the connection system further comprises at least one locking member for securing the first umbilical coupling part and the second umbilical coupling part to each other when they have been properly connected to each other.

12. The connection system according to claim 1, wherein the connection unit comprises at least one locking member which is moveable between a locking position, in which the locking member prevents the termination box from being axially displaced in relation to the connection unit, and an unlocking position, in which the locking member allows the termination box to be axially displaced in relation to the connection unit.

13. The connection system according to claim 1, wherein the base frame comprises at least two connection pins which extend into the slide channel at opposite sides of the slide channel, each connection pin being received in a longitudinal connection groove provided in the termination box to thereby secure the termination box to the slide channel while allowing the termination box to slide in the longitudinal direction of the slide channel.

14. The connection system according to claim 13, wherein the connection unit further comprises an installation yoke, which is pivotally mounted to the base frame and in which the base frame is intended to be suspended when the connection unit is lowered downwards into contact with the landing unit.

15. The connection system according to claim 14, wherein the installation yoke comprises a first arm, which is pivotally connected to the base frame through a first joint, and a second arm, which is pivotally connected to the base frame through a second joint, the installation yoke and the base frame being pivotable in relation to each other about a pivot axis formed by the first joint and the second joint.

16. The connection system according to claim 1, wherein the connection unit further comprises an installation yoke, which is pivotally mounted to the base frame and in which the base frame is intended to be suspended when the connection unit is lowered downwards into contact with the landing unit.

17. A connection system for subsea connection of a first subsea umbilical to a subsea appliance in the form of a second subsea umbilical or an umbilical termination assembly, wherein the first subsea umbilical and the subsea appliance comprise several fluid conduits, the connection system comprising;
   a termination box fixed to an end section of the first subsea umbilical, the termination box comprising a front end and an opposite rear end, wherein the first subsea umbilical extends through an opening at the rear end of the termination box;
   a first umbilical coupling part mounted to the termination box at the front end thereof, this coupling comprising several first coupling members, each of which being connected to one of the fluid conduits of the first subsea umbilical;
   a second umbilical coupling part which is connectable to the first umbilical coupling part and comprises several second coupling members, each of which being connected to one of the fluid conduits of the subsea appliance and being configured to engage with one of the first coupling members when the first umbilical coupling part and the second umbilical coupling part are connected to each other;
   a connection unit, the termination box being slidablv mounted to the connection unit so as to be axially displaceable in relation to the connection unit;
   a landing unit, which has a fixed position in relation to the second umbilical coupling part wherein the connection unit is connectable to the landing unit by being lowered downwards into contact with the landing unit, the connection unit comprising guide members configured to co-operate with corresponding guide members on the landing unit so as to guide the connection unit into a correct. position in relation to the landing unit when the connection unit is lowered downwards into contact with the landing unit; and
   an actuating unit configured to displace the termination box and the end section of the first subsea umbilical axially forwards in relation to the connection unit so as to bring the first umbilical coupling part into contact with the second umbilical coupling part,
   wherein the connection unit comprises a base frame comprising a U-shaped slide channel, the termination box being slidably received in this slide channel, and
   wherein the base frame comprises at least two connection pins which extend into the slide channel at opposite sides of the slide channel, each connection pin being received in a longitudinal connection groove provided in the termination box to thereby secure the termination box to the slide channel while allowing the termination box to slide in the longitudinal direction of the slide channel.

18. The connection system according, to claim 17, wherein the connection unit further comprises an installation yoke, which is pivotally mounted to the base frame and in which the base frame is intended to be suspended when the connection unit is lowered downwards into contact with the landing unit.

19. A connection system for subsea connection of a first subsea umbilical to a subsea appliance in the form of a second subsea umbilical or an umbilical termination assembly, wherein the first subsea umbilical and the subsea appliance comprise several fluid conduits, the connection system comprising:
   as termination box fixed to an end section of the first subsea umbilical, the termination box comprising as front end and an opposite rear end, wherein the first subsea umbilical extends through an opening at the rear end of the termination box;
   a first umbilical coupling part mounted to the termination box at the front end thereof, this coupling part comprising several first coupling members, each of which being connected to one of the fluid conduits of the first subsea umbilical;
   a second umbilical coupling part which is connectable to the first umbilical coupling pan and comprises several second coupling members, each of which being connected to one of the fluid conduits of the subsea appliance and being configured to engage with one of the first coupling members when the first umbilical coupling part and the second umbilical coupling part are connected to each other;
   a connection unit, the termination box being slidably mounted to the connection unit so as to be axially displaceable in relation to the connection unit;
   a landing unit, which has a fixed position in relation to the second umbilical coupling part, wherein the connection unit is connectable to the landing unit by being lowered downwards into contact with the landing unit, the connection unit comprising guide members configured to co-operate with corresponding guide members on the landing unit so as to guide the connection unit into a correct position in relation to the landing unit when the connection unit is lowered downwards into contact with the landing unit; and
   an actuating unit configured to displace the termination box and the end section of the first subsea umbilical axially forwards in relation to the connection unit so as to bring the first umbilical coupling part into contact with the second umbilical coupling part, wherein the connection unit comprises a base frame, the termination box being slidably connected to the base frame, wherein the connection unit further comprises an installation yoke, which is pivotally mounted to the base frame and in which the base frame is intended to be suspended when the connection unit is lowered downwards into contact with the landing unit, wherein the installation yoke comprises a first arm, which is pivotally connected to the base frame through a first joint, and as second arm, which is pivotally connected to the base frame through a second joint, the installation yoke and the base frame being pivotable in relation to each other about a pivot axis formed b the first joint and the second joint, and wherein the guide members on the connection unit comprise two guide pins, which extend from the base frame in opposite directions and which are concentric with the pivot axis, each one of these guide pins being configured to come into engagement with a corresponding guide member in the form of a guide groove provided in the landing unit when the connection unit is lowered downwards into contact with the landing unit.

20. A connection system for subsea connection of a first subsea umbilical to a subsea appliance in the form of a second subsea umbilical or an umbilical termination assembly, wherein the first subsea umbilical and the subsea appliance comprise several fluid conduits, the connection system comprising:

a termination box fixed to an end section of the first subsea umbilical, the termination box comprising a front end and an opposite rear end, wherein the first subsea umbilical extends through an opening at the rear end of the termination box;

a first umbilical coupling part mounted to the termination box at the front end thereof, this coupling part comprising several first coupling members, each of which being connected to one of the fluid conduits of the first subsea umbilical;

a second umbilical coupling, part which is connectable to the first umbilical coupling part and comprises several second coupling members, each of which being connected to one of the fluid conduits of the subsea appliance and being configured to engage with one of the first coupling members when the first umbilical coupling part and the second umbilical coupling part are connected to each other;

a connection unit, the termination box being slidably mounted to the connection unit so as to be axially displaceable in relation to the connection unit;

a landing unit, which has a fixed position in relation to the second umbilical coupling part, wherein the connection unit is connectable to the landing unit by being lowered downwards into contact with the landing unit, the connection unit comprising guide members configured to co-operate with corresponding guide members on the landing unit so as to guide the connection unit into a correct position in relation to the landing unit when the connection unit is lowered downwards into contact with the landing unit; and an actuating unit configured to displace the termination box and the end section of the first subsea umbilical axially forwards in relation to the connection unit so as to bring the first umbilical coupling part into contact with the second umbilical coupling part, wherein the connection unit comprises a base frame, the termination box being slidably connected to the base frame, wherein the connection unit further comprises an installation yoke, which is pivotally mounted to the base frame and in which the base frame is intended to be suspended when the connection unit is lowered downwards into contact with the landing unit, and wherein the installation yoke comprises at least one locking member winch is configured to come into engagement with a corresponding locking member on the landing unit when the guide members on the connection unit are in engagement with the corresponding guide members on the landing unit and the installation yoke is pivoted in relation to the base frame from a raised position to a lowered position, wherein these locking, members, when they are in engagement with each other, prevent the connection unit from being disconnected from the landing unit.

* * * * *